United States Patent [19]

Takahashi

[11] Patent Number: 5,124,092

[45] Date of Patent: Jun. 23, 1992

[54] METHOD OF BAKING SHAPED CARBONACEOUS PRODUCTS

[75] Inventor: Susumu Takahashi, Yokohama, Japan

[73] Assignee: Kanto Yakin Kogyo Kakushiki Kaisha, Kabagawa, Japan

[21] Appl. No.: 687,043

[22] Filed: Apr. 18, 1991

Related U.S. Application Data

[63] Continuation-in-part of Ser. No. 509,217, Apr. 16, 1990, abandoned.

[30] Foreign Application Priority Data

May 19, 1989 [JP] Japan .................................. 1-126292

[51] Int. Cl.$^5$ ...................... B29C 71/02; C01B 31/02
[52] U.S. Cl. ..................................... 264/29.6; 53/427; 53/432; 53/440; 264/101; 264/297.5; 423/447.7; 423/449
[58] Field of Search ................. 264/29.1, 29.5, 29.6, 264/101, 102, 297.1, 297.5, 345, 347; 423/445, 447.1, 447.4, 447.7, 448, 449, 460; 53/111 R, 127, 427, 428, 432, 440, 509, 510, 512

[56] References Cited

U.S. PATENT DOCUMENTS

| | | | |
|---|---|---|---|
| 2,376,760 | 5/1945 | Elsey | 264/29.6 |
| 3,308,943 | 3/1967 | Davila | 53/440 X |
| 5,055,243 | 10/1991 | Takahashi | 264/29.1 |

Primary Examiner—Leo B. Tentoni
Attorney, Agent, or Firm—Shlesinger Fitzsimmons Shlesinger

[57] ABSTRACT

The baking or heat treating of products, which must take place at an extremely high temperature and under a strict non-oxidizing inert furnace atmosphere, is advantageously made by conveying the products into the furnace atmosphere only after having the products vacuum-packed in resinous films or bags, thereby to prevent oxygen, vapor, and the like, which might be trapped on or in the products, from entering into and contaminating the furnace atmosphere, and also in order to eliminate various apparatus which otherwise is required by conventional baking methods, such as vacuum chambers, bulky and thermal energy-wasting conveyor trays, and the like.

2 Claims, 1 Drawing Sheet

METHOD OF BAKING SHAPED CARBONACEOUS PRODUCTS

RELATED APPLICATION

This application is a continuation-in-part of my copending application Ser. No. 07/509,217, filed Apr. 16, 1990, now abandoned.

BACKGROUND OF THE INVENTION

This invention relates to a method for baking at a high temperature carbon fiber fabric or rovings which have been laminated or wound up into sheets, tubes or other shapes, in order to adjust their electrical and physical properties, such as their electric resistance, tensile strength, modules of tensile elasticity, and the like.

As taught, for example, by U.S. Pat. Nos. 3,914,395, 4,714,642, 3,964,952 and 4,576,810, it is conventional to prepare and form carbon fibers into various shapes such as tows, tapes, woven sheets, etc. Such shaped carbon fiber products in turn may be utilized for fabricating various goods such as component parts of electric appliances, carriers for active carbon, high-temperatures resistant structural materials or components, and the like.

However, it is also well known that the carbon fibers which constitute such goods have electrical and physical properties which are greatly influenced by the conditions under which the fibers are made. For this reason, in order for the shaped carbon fibers to exhibit desirable such properties, it is widely known to bake the shaped carbon fibers at elevated temperatures, and for such times which will provide them with the desired properties. As taught for example in U.S. Pat. No. 3,628,984, such baking or heating temperatures are generally about 1,800° C. in case of the carbonization of the fibers, and about 2,000° to 3,000° C. in case of graphitization thereof. And, the baking is made in an inert atmosphere employing nitrogen, argon, helium gases, and the like, so that carbon fibers will not be oxidized.

As noted in greater detail hereinafter, in order to achieve this kind of baking, it has been customary in the past to employ baking furnaces utilizing tray-pusher conveyance systems, which are provided with oxygen purging or vacuum chambers. When shaped carbon fiber articles are to be heat-treated in this type of furnace, any oxygen and vapor contained in or adhered to the articles is first removed or purged off the articles before they are fed into an inert gas atmosphere in the furnace. Sometimes when the articles are heated to more than 2,000° C., it is preferable also to remove even hydrogen therefrom.

In order to effect this purging requirement, it heretofore has been necessary to provide at both the inlet and outlet of the tray-pusher type furnace, vacuum chambers which considerably complicate the method of heat treating the articles.

SUMMARY OF THE INVENTION

In the method made in accordance with this invention, the carbon fiber articles that are to be thermally treated are vacuum-packed, at the outside of a furnace system, and are then transferred into the furnace system.

PREFERRED EMBODIMENT OF THE INVENTION

Figure 2:
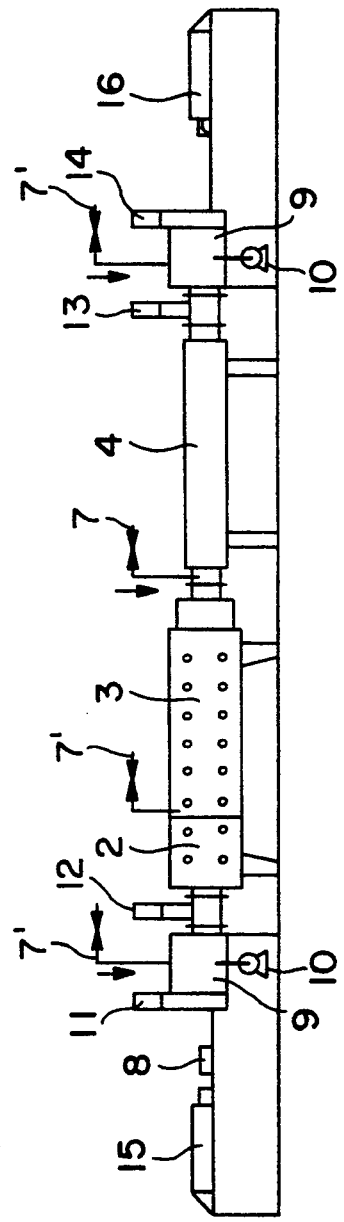
FIG. 2 is a similar view of a high-temperature baking furnace which has been utilized heretofore in conventional baking methods.

Referring now to the drawing by numerals of reference, and first to the prior art furnace shown in FIG. 2, the numerals 9 denote the two above-noted vacuum chambers which are located at the inlet and outlet ends (left and right ends, respectively) of this conventional furnace. At the inlet end articles 8 mounted on graphite trays are fed into the first vacuum chamber 9, being pushed one by one by pusher means 15. Then, a shutter 11 is closed. Into this first vacuum chamber 9, which is placed under a vacuum by a vacuum pump 10, there is also introduced an inlet gas such as nitrogen, from an inlet pipe 7'.

A preheating chamber 2 and a baking chamber 3 are kept at predetermined temperatures, while they are charged with an inert gas supplied by another conduit pipe 7'. Another shutter 12 is opened, and the articles 8 are forwarded into the preheating chamber 2.

The articles 8 which are thus pushed by the pusher means one by one, and subsequently pushed by each other, proceed through the baking chamber 3, and to a cooling chamber 4. When they reach the outward or second vacuum chamber 9, they are discharged from the furnace by means of a puller means 10. In FIG. 2 numeral 7 indicates another conduit pipe for supplying an inert gas such as argon into the furnace. Numerals 13, 14 are other shutters similar to the shutters 11, 12.

In this conventional method of baking or heat treating shaped carbon fiber articles, the articles are intermittenly charged into the first vacuum chamber. This chamber, the volume of which is considerably larger compared to the volume occupied by the articles, has to be placed under vacuum repeatedly each time that the articles are charged into and discharged from the chamber. The articles are conveyed through the furnace on trays which are mostly made of graphite, so that they can withstand temperatures as high as 3,000° C. Such graphite trays are much heavier than the articles they convey. They also are very large, so that they can be advanced while being engaged with each other at their shoulders or end walls.

In other words, since the weight or sizes of the trays are several to ten times those of the articles to be conveyed by the trays, a large part of the thermal energy produced in a furnace for heating the articles is wasted by heating the trays, whereby the thermal efficiency of the furnace becomes extremely low. It is disadvantageous also that oxygen and water vapor adhered to or absorbed by the trays have to be purged off also in the vacuum chamber.

Figure 1:
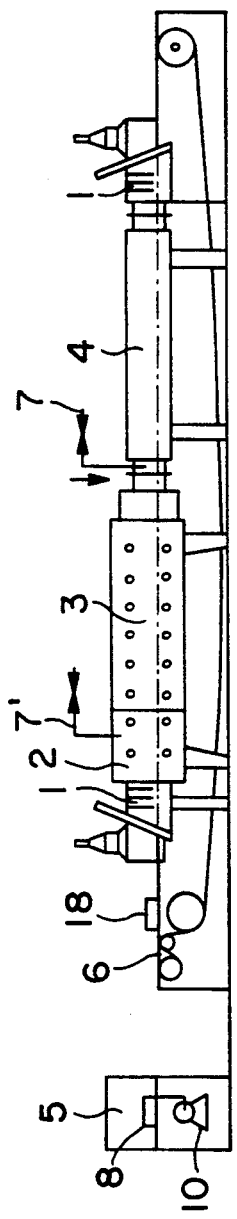
FIG. 1 is an explanatory side sectional view of a high-temperature baking furnace which will be employed advantageously for carrying out the method of this invention.

Referring now to the furnace shown in FIG. 1, wherein like numerals are employed to denote elements similar to those shown in FIG. 2, felt-like unwoven fabrics made from carbon fibers of 8 μm in diameter and of a tensile strength of 70 Kg/mm² were laminated to a shape of about 30 mm in thickness, about 300 mm in width, about 300 mm in length, and about 81 g in weight.

In order to give the carbon fibers thus shaped the properties which were desired for their use as wall liners in a high temperature furnace, they were baked at a high temperature, as follows:

The shaped carbon fibers 8 were vacuum-packed at a pressure of 1 torr, and at the outside of the furnace system in FIG. 1, in thin polyethylene membranes or bags, employing a vacuum-packing apparatus 5 provided with a vacuum pump 10.

The shaped carbon fibers reduced their thickness to about 8 mm when they were vacuum-packed in the polyethlene membranes.

The high-temperature baking furnace shown in FIG. 1 is provided with an endless mesh belt conveyor 6 which is made from carbon fiber reinforced carbon materials so that it can withstand a high temperature when working within the furnace. The furnace heating elements are made from graphite rods, and insulation members in high-temperature zones are made of porous carbon sheets and carbon felts, and insulation members in high-temperature zones are made of porous carbon sheets and carbon felts, and insulation members in a lower-temperature zone are made of ceramic felts.

A preheating chamber 2 (FIG. 1) was heated to 700° C., and a heating chamber 3 was 1,200° C. at its medium heating zone and 2,500° C. at its maximum heating zone. Nitrogen and argon gases respectively sent from conduits 7, 7' constituted a furnace atmosphere, whereby oxygen density in the baking chamber 3 was kept at less than 1 ppm. In FIG. 1, numerals 1 represent ambient shutting out chambers to prevent loss of furnace heat, etc.

The shaped and vacuum packed articles 18 were transferred to the furnace by means of the conveyor belt 6, and kept in the furnace for 1 hour at 2,500° C. Then, the articles were discharged from the furnace after they had been cooled in a cooling chamber 4.

The resultant baked articles had such properties (electric resistance rate of 0.3 $\Omega$·cm, thermal conductivity rate of 0.6 Kcal/mh° C., density of 0.06 g/cm$^3$, compression strength at 10% deformation of 20 g/cm$^2$) which are suited for the purpose of use above-mentioned.

On account of such unique and novel features of this invention, a number of installations which are prerequisite to conventional baking furnaces of the kind mentioned above, such as those vacuum chambers 9, vacuum pumps 10, conduit pipes 7', and shutters 11, 12, 13, 14 which are shown in FIG. 2 at both inlet and outlet furnace openings, are eliminated. Thus labor and energy for operating these installations are not required in this invention.

It is also advantageous in this invention that vacuum-packed articles shall not necessarily be conveyed by trays, but they can be continuously circulated through a furnace. In this invention, therefore, trays are not essential for conveying articles, and thermal energies which have been wasted for unnecessarily heating trays, are saved.

Bags which are made of synthetic resins such as polyethylene and nylon, and employed for vacuum-packing articles in this invention, are removed from the articles by being sublimed or burned out when the articles are heated in the furnace. Since this sublimation or burning out accompanies a reaction of the resins with oxygen and water vapor remaining in a furnace, the oxygen content of the furnace will be reduced.

Thus, it shall be readily seen that the method made in accordance with this invention certainly has the aforementioned advantages and remarkable effects. It will be noted also that even when adhesive resins or pitches are employed as binders for stabilizing shapes of carbon fibers, it will not be difficult to handle the shaped fibers which become sticky on account of the resins impregnated thereto, since they are vacuum-packed in bags. This is one of the advantageous aspects of this invention.

I claim:

1. In a method of effecting the high-temperature baking of carbon fiber products for the purpose of adjusting their characteristic properties, including electric resistance, tensile strength, and modules of tensile elasticity, by conveying the products into a furnace having therein an inert gas atmosphere, wherein the improvement comprises vacuum packing said carbon fiber shaped products in bags made from synthetic resins before conveying the vaccum packed products into said furnace, baking said vacuum packed products in said furnace at a high-temperature, and thereafter causing said products to be discharged from the furnace after having been cooled.

2. The method as claimed in claim 1, including conveying said vacuum packed products to, transferring said products through, and discharging said products from said furnace by means of a mesh type belt conveyor made from carbon fiber reinforced carbon materials.

* * * * *